United States Patent
Tu et al.

(10) Patent No.: US 12,284,513 B2
(45) Date of Patent: Apr. 22, 2025

(54) METHOD FOR MANAGING NETWORK SLICE CONNECTION, TERMINAL AND COMPUTER-READABLE STORAGE MEDIUM

(71) Applicant: ZTE Corporation, Guangdong (CN)

(72) Inventors: Dingyuan Tu, Guangdong (CN); Bing Fu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 259 days.

(21) Appl. No.: 17/802,887

(22) PCT Filed: May 21, 2021

(86) PCT No.: PCT/CN2021/095283
§ 371 (c)(1),
(2) Date: Aug. 26, 2022

(87) PCT Pub. No.: WO2022/001474
PCT Pub. Date: Jan. 6, 2022

(65) Prior Publication Data
US 2023/0143835 A1    May 11, 2023

(30) Foreign Application Priority Data

Jun. 28, 2020 (CN) .......................... 202010600448.2

(51) Int. Cl.
*H04W 12/06* (2021.01)
*H04L 41/00* (2022.01)
(Continued)

(52) U.S. Cl.
CPC ............. *H04W 12/06* (2013.01); *H04L 41/00* (2013.01); *H04W 12/08* (2013.01); *H04W 76/10* (2018.02)

(58) Field of Classification Search
CPC ...... H04W 12/06; H04W 76/10; H04W 12/08
See application file for complete search history.

(56) References Cited

U.S. PATENT DOCUMENTS

2013/0078947 A1\* 3/2013 Pecen ................. H04L 63/1458
455/411
2017/0245316 A1    8/2017 Salkintzis
(Continued)

FOREIGN PATENT DOCUMENTS

CN    106713406 A    5/2017
CN    107809776 A    3/2018
(Continued)

OTHER PUBLICATIONS

European Search Report issued in EP Patent Application No. 21834414.1, dated Sep. 20, 2023, 8 pages.
(Continued)

*Primary Examiner* — Won Tae C Kim
(74) *Attorney, Agent, or Firm* — Perkins Coie LLP

(57) ABSTRACT

Provided are a method for managing network slice connection, a terminal and a computer-readable storage medium. The method for managing network slice connection includes: obtaining connection request information transmitted by a terminal application in a case where the terminal application initiates a network slice connection request; performing an authentication process on the terminal application initiating the network slice connection request; and in response to the terminal application passing the authentication process, enabling the terminal application to connect to a network slice according to the connection request information.

20 Claims, 4 Drawing Sheets

(51) Int. Cl.
*H04W 12/08* (2021.01)
*H04W 76/10* (2018.01)

(56) References Cited

U.S. PATENT DOCUMENTS

| | | | |
|---|---|---|---|
| 2018/0191782 | A1 | 7/2018 | Djordjevic et al. |
| 2018/0192471 | A1 | 7/2018 | Li et al. |
| 2019/0364460 | A1 | 11/2019 | Bogineni et al. |
| 2021/0344680 | A1* | 11/2021 | Guo ............... H04W 12/71 |

FOREIGN PATENT DOCUMENTS

| | | | |
|---|---|---|---|
| CN | 108347729 | A | 7/2018 |
| CN | 109525409 | A | 3/2019 |
| CN | 111131258 | A | 5/2020 |
| WO | 2018045983 | A1 | 3/2018 |
| WO | 2018119608 | A1 | 7/2018 |
| WO | 2020035732 | A1 | 2/2020 |

OTHER PUBLICATIONS

Huawei et al., "Discussion on Application Descriptor," 3GPP TSG-WG SA2 Meeting #137E e-meeting, S2-2002124 (revision of S2-200xxxx), Elbonia, Feb. 24-27, 2020, 5 pages.
Nokia, "Network Slice Initial Attach and Authentication," 3GPP TSG SA WG3 (Security) Meeting—NextGen, 53-161347, Sep. 27-29, 2016, San Diego, USA, 3 pages.
Chinese Decision of Patent issued in CN Patent Application No. 202010600448.2, dated Jul. 1, 2023, 6 pages. English translation included.
Chinese office action issued in CN Patent Application No. 202010600448.2, dated Jan. 30, 2023, 16 pages. English machine translation included.
Motorola Mobility et al., "Solution for network slice authentication and authorisation," SA WG2 #128bis, Sophia Antipolis, France, S2-188261, 5 pages, Aug. 20-24, 2018.
International Search Report and Written Opinion for International Application No. PCT/CN2021/095283, mailed on Aug. 16, 2021 (8 pages with English translation).

* cited by examiner

In response to the application feature information in the connection request
information being matched to a list of feature information stored in a terminal,
determine that the terminal application passes the authentication process;
where the list of feature information list includes authorized application
feature information corresponding to terminal applications
authorized by a server  — S210

FIG.3

Transmit application information updating request information of
an authorized target terminal application to the server — S400

Obtain and store the list of feature information transmitted by the server
according to the application information updating request information — S500

FIG.4

METHOD FOR MANAGING NETWORK SLICE CONNECTION, TERMINAL AND COMPUTER-READABLE STORAGE MEDIUM

CROSS-REFERENCE TO RELATED APPLICATION(S)

This application is a U.S. National Stage Application filed under 35 U.S.C. 371 based on International Patent Application No. PCT/CN2021/095283, filed May 21, 2021, which claims priority to Chinese patent application No. 202010600448.2 filed Jun. 28, 2020, the disclosures of which are incorporated herein by reference in their entireties.

FIELD

Embodiments of the present application relate to, but are not limited to, the field of communication technology, and in particular, to a method for managing network slice connection, a terminal, and a computer-readable storage medium.

BACKGROUND

As an important technology of 5th Generation (5G) networks, network slice allows operators to partition multiple virtual end-to-end networks within one hardware infrastructure. Each network slice realizes logical isolation in terms of terminals, access networks, transmission networks, and core networks, and can adapt to various types of services and meet different needs of users.

The end-to-end implementation of the network slice function requires the joint participation of a 5G terminal and a 5G network, and the security mechanism of a network slice between the 5G terminal and the 5G network is a crucial point for realizing the network slice function. However, the industry and standard specifications currently focus on the isolation and security of the network slice in access networks, bearer networks, and core networks, and have not considered the security guarantee of upper-layer applications of terminals accessing and using the network slice. Therefore, there will be a risk of other non-compliant terminal applications using the network slice fraudulently or interfering with the network slice's own services.

SUMMARY

The following is a summary of the subject matter to be described in detail below. The summary is not intended to limit the protection scope of the claims.

Embodiments of the present application provide a method for managing network slice connection, a terminal, and a computer-readable storage medium.

In a first aspect, embodiments of the present application provide a method for managing network slice connection, including: obtaining connection request information transmitted by a terminal application when the terminal application initiates a network slice connection request; performing authentication process on the terminal application initiating the network slice connection request; and in response to the terminal application passing the authentication process, enabling the terminal application to connect to a network slice according to the connection request information.

In a second aspect, embodiments of the present application further provide a terminal, including: a memory, a processor, and a computer program stored on the memory and executable on the processor. The processor, when executing the computer program, implements the method for managing network slice connection described in the first aspect.

In a third aspect, embodiments of the present application further provide a computer-readable storage medium, which stores computer-executable instructions. The computer-executable instructions are used to perform the above-described method for managing network slice connection.

Other features and advantages of the present application will be explained in the specification below, and in part will become apparent from the specification, or may be understood by implementing the present application. The objectives and other advantages of the present application may be realized and obtained by the structures particularly pointed out in the specification, claims, and drawings.

BRIEF DESCRIPTION OF THE DRAWINGS

The drawings provide a further understanding of the solution of the present application, constitute a portion of the specification, and are used to explain the technical solution of the present application together with the embodiments of the present application, rather than limiting the solution of the present application.

FIG. 3 is a flowchart of a method for managing network slice connection provided by another embodiment of the present application;

FIG. 4 is a flowchart of a method for managing network slice connection provided by another embodiment of the present application;

DETAILED DESCRIPTION OF EMBODIMENTS

In order to make the objectives, solutions, and advantages of the present application clearer, the present application will be described in detail below with reference to drawings and embodiments. It should be understood that the specific embodiments described herein are merely used for explaining the present application and are not intended to limit the present application.

It is noteworthy that although functional modules are divided in apparatus schematic diagrams and logical orders are shown in flowcharts, in some cases, steps shown or described may be performed in a manner different from the module division in the apparatus or the order in the flowchart. The terms "first," "second" and the like in the specification and claims and the above drawings are used for differentiating similar objects and are not necessarily used for describing the specific order or sequence.

The present application provides a method for managing network slice connection, a terminal, and a computer-readable storage medium. When connection request information transmitted by a terminal application due to the terminal application initiating a network slice connection request is received, firstly authentication process is performed on the terminal application that initiates the network slice connection request. Only in a case where the terminal application passes the authentication process, the terminal application is enabled to connect to a network slice according to the connection request information. Therefore, other non-compliant terminal applications can be prevented from fraudulently using or attacking network slices, and the security guarantee of upper-layer applications of the terminal when accessing and using network slices, which the existing security mechanism of 5G networks lacks, can be complemented.

The embodiments of the present application will be further described below with reference to the drawings.

Figure 1:
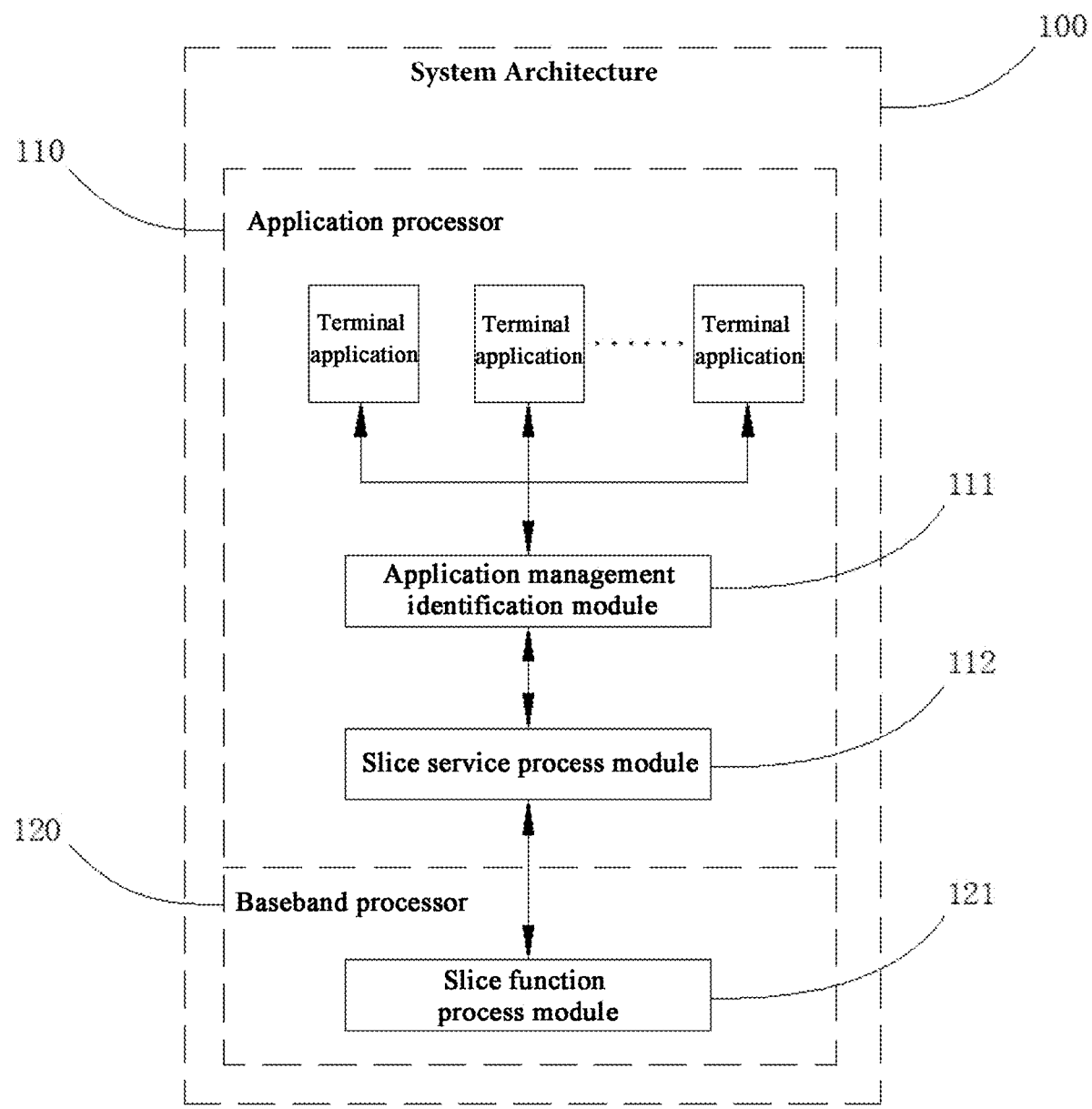
FIG. 1 is a schematic view of a system architecture for performing a method for managing network slice connection provided by an embodiment of the present application.

As shown in FIG. 1, FIG. 1 is a schematic view of a system architecture for implementing a method for managing network slice connection provided by an embodiment of the present application. In the example of FIG. 1, the system architecture 100 includes an application processor 110 and a baseband processor 120 connected to the application processor 110. An application management identification module 111 and a slice service process module 112 are provided in the application processor 110. In addition, various terminal applications are installed in the application processor 110. A slice function process module 121 is provided in the baseband processor 120. Each terminal application is connected to the application management identification module 111. The application management identification module 111, the slice service process module 112, and the slice function process module 121 are connected in sequence.

The application management identification module 111 is configured to discriminate a terminal application that initiates a network slice connection request. When it is found that the corresponding terminal application needs to be subjected to authorization identification, the application management identification module 111 requires the terminal application to initiate an identification operation to an application server or perform a local identification operation. Only after the identification succeeds, the application management identification module 111 allows the connection request information transmitted by the terminal application to be transmitted to the slice service process module 112. The slice service process module 112 is configured to, after receiving the connection request information transmitted by the application management identification module 111, parse a request parameter in the connection request information and then transmit the request parameter to the slice function process module 121. The slice function process module 121 is configured to, after receiving request parameters transmitted by the slice service process module 112, perform UE Route Selection Policy (URSP) rule matching according to these request parameters, select a corresponding network slice identifier (S-NSSAI), and then use the network slice identifier to apply to the network side for establishing a Protocol Data Unit (PDU) session with the corresponding network slice. If the PDU session with the current network slice already exists, the connection request information transmitted by the current terminal application is bound to the corresponding PDU session, so that the current terminal application can directly use the PDU session. It is noteworthy that the server is maintained by the operator that provides the network slice service and is mainly configured to perform authorization identification and information updating on the network slice service of the terminal application. Regarding the terminal application that needs authorization identification, only after the terminal application successfully performs identification with the server, the network slice connection request initiated by the terminal application on the terminal is allowed to be accepted.

The system architecture and application scenario described in the embodiments of the present application are intended to illustrate the technical solutions of the embodiments of the present application more clearly and do not constitute a limitation on the technical solutions provided by the embodiments of the present application. Those skilled in the art will appreciate that with the evolution of the system architecture and the emergence of new application scenarios, the technical solutions provided in the embodiments of the present application are also applicable to similar technical problems.

Those skilled in the art can understand that the structure of the system architecture 100 shown in FIG. 1 does not constitute a limitation on embodiments of the present application. The system architecture 100 may include more or fewer components than those shown in the figures, combine some components or have different component arrangements.

In the system architecture 100 shown in FIG. 1, the terminal application, the application management identification module 111, the slice service process module 112, and the slice function process module 121 may cooperate to implement the method for managing network slice connection.

Based on the structure of the above system architecture, there are proposed various embodiments of the method for managing the network slice connection of the present application.

Figure 2:
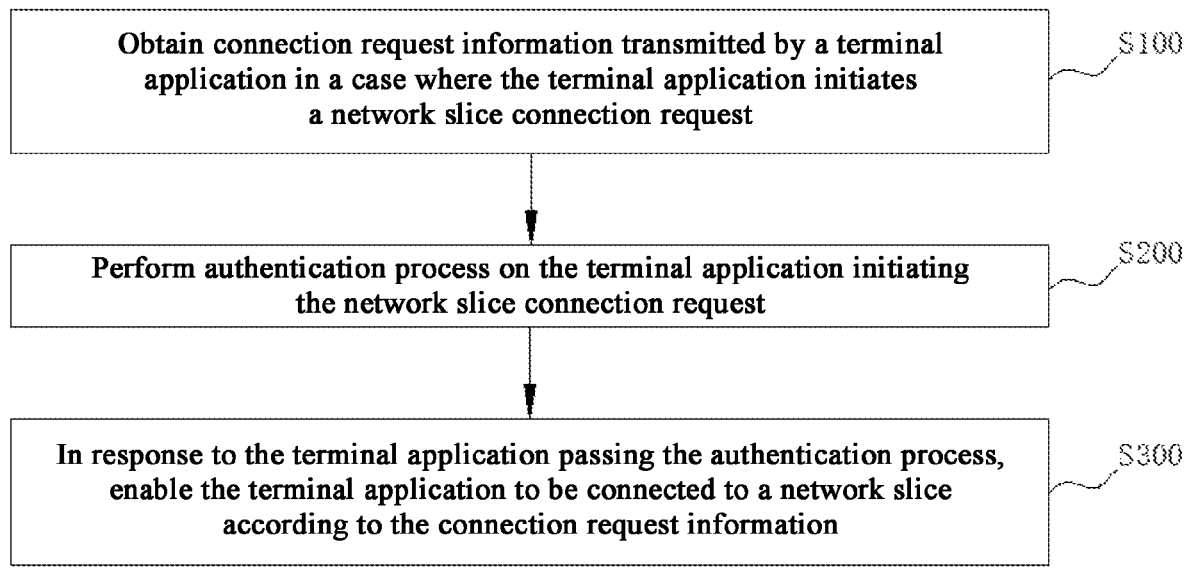
FIG. 2 is a flowchart of a method for managing network slice connection provided by an embodiment of the present application.

As shown in FIG. 2, FIG. 2 is a flowchart of a method for managing network slice connection provided by an embodiment of the present application, the method for managing the network slice connection includes, but is not limited to, S100, S200, and S300.

In S100, connection request information transmitted by a terminal application is obtained in a case where the terminal application initiates a network slice connection request.

In an embodiment, when a user starts a terminal application in a terminal, if the terminal application supports the network slice service of 5G networks, the terminal application will initiate a network slice connection request and transmit connection request information, so that when the connection request information is accepted in a subsequent step, the terminal may apply to the network side for connecting a network slice according to the connection request information.

In an embodiment, the connection request information transmitted by the terminal application when the terminal application initiates the network slice connection request may carry application feature information corresponding to the terminal application. The application feature information includes network slice selection parameter information for selecting a network slice, feature parameter information for verifying whether the terminal application is authorized to use the corresponding network slice, etc. The network slice selection parameter information includes, but is not limited to, Data Network Name (DNN), Full Qualified Domain Name (FQDN), a terminal application identifier (Application ID), IP triplet, and other parameter information. The feature parameter information includes, but is not limited to, application package name, application name, authorization information in the authentication process, etc. It is noteworthy that the network slice selection parameter information may also be used in the authentication process on the terminal application.

In S200, authentication process is performed on the terminal application initiating the network slice connection request.

In an embodiment, in a case where a terminal application initiates a network slice connection request, firstly authentication process is performed on the terminal application, so that in the subsequent steps only terminal applications that have passed the authentication process can apply for access to the network slice, thereby preventing other non-compliant terminal applications from fraudulently using or attacking network slices.

In an embodiment, there may be different implementations for authentication process on the terminal application, and the present embodiment does not make a specific limitation in this regard. For example, a list of terminal applications that have passed the authorization authentication of the server may be stored in the terminal in advance, or a feature information list corresponding to terminal applications that have passed the authorization identification of the server may be stored in the terminal in advance. When a terminal application is matched to the content of the list of terminal applications or is matched to the content of the feature information list, it may be considered that the terminal application passes the authentication process; otherwise, it is considered that the terminal application does not pass the authentication process. In another example, when there is a need to perform authentication process on a terminal application, authentication process such as token-based identity verification or digital signature can be performed between the terminal application and the server. In another example, the terminal application may be authenticated by judging whether the terminal application carries signature identification information.

In S300, in response to the terminal application passing the authentication process, the terminal application is enabled to connect to the network slice according to the connection request information.

In an embodiment, when the terminal application passes the authentication process, it means that the terminal application belongs to compliant terminal applications, and the user may enjoy the service of connecting the terminal application to the network slice. Therefore, the terminal application may be enabled to connect to the corresponding network slice according to the connection request information transmitted by the terminal application when the terminal application initiates the network slice connection request. Since only the terminal application that has passed the authentication process can access the network slice, other non-compliant terminal applications can be prevented from fraudulently using or attacking the network slice.

In an embodiment, when the terminal application is enabled to connect to the network slice according to the connection request information, since the connection request information carries parameter information such as DNN, FQDN, terminal application name, and IP triplet, the parameter information may be used to perform URSP rule matching for network slices, so that a corresponding network slice identifier may be selected. Further, the network slice identifier may be used for applying to the network side to establish a PDU session with the corresponding network slice. If the PDU session with the network slice already exists, the connection request information transmitted by the terminal application is bound to the PDU session. After returning successfully, the terminal application can use the PDU session with the network slice, so that the access operation of the terminal application to the network slice is realized.

In an embodiment, after the terminal registers with the network, the terminal application may use the default network slice to perform data interaction with the network side according to the default service determined between the terminal and the server. In addition, the terminal application may further apply to the network side for a dedicated network slice according to the value-added service determined between the terminal and the server. In view of the above situation, if the network slice connection request initiated by the terminal application is a PDU session request for a default network slice, since the default network slice is provided according to the default service determined between the terminal and the server, it may be considered by default that all terminal applications of the terminal have passed the authorization identification. Thus, URSP rule matching may be performed directly according to the connection request information transmitted by the terminal application. If the PDU session request for the default network slice is matched to the network slice identifier of the default network slice in the URSP rule, a PDU session request with the default network slice is initiated to the network side by using the network slice identifier, or the connection request information is bound to an existing PDU session with the default network slice. It is noteworthy that if the PDU session request for the default network slice fails to match any network slice identifier in the URSP rule, an ordinary PDU session establishment request for a non-network slice may be initiated to the network side, or the connection request information may be bound to an existing ordinary PDU session with the default non-network slice.

In an embodiment, by using the method for managing network slice connection including the above S100, S200, and S300, when the connection request information transmitted by a terminal application initiating a network slice connection request is received, firstly authentication process is performed on the terminal application that initiates the network slice connection request. Only in a case where the terminal application passes the authentication process, the terminal application is enabled to connect to the network slice according to the connection request information. Therefore, other non-compliant terminal applications may be prevented from fraudulently using or attacking the network slice, the security guarantee of upper-layer applications of terminals when accessing and using network slices, which the existing security mechanism of 5G networks lacks, can be complemented, and the end-to-end security connection of the network slice is truly guaranteed.

In addition, in an embodiment, with reference to FIG. 3, S200 may include, but is not limited to, the following:

S210, in response to the application feature information in the connection request information match the feature information list stored in the terminal, it is determined that the terminal application passes the authentication process. The feature information list includes authorization feature information corresponding to terminal applications authorized by the server.

In an embodiment, the terminal may store a feature information list corresponding to terminal applications that have passed the authorization identification of the server. When the application feature information in the connection request information can match the feature information list, i.e., in a case where the application feature information in the connection request information can match authorized application feature information in the feature information list, it is considered that the terminal application passes the authentication process. Therefore, in the subsequent steps, when the connection to the network slice is performed on the terminal application that has passed the authentication process, other non-compliant terminal applications may be prevented from fraudulently using or attaching the network slice.

In an embodiment, the feature information list including authorized application feature information, and stored in the terminal may be obtained by requesting the server or negotiating with the server, after the terminal completes the registration with the network. For example, the terminal may transmit, to the server, application information updating request information of all terminal applications or some specific terminal application supported by the terminal. And then, the server determines, from these terminal applications, a terminal application that has been authorized to use the network slice, forms a feature information list including authorized application feature information, and transmits the feature information list to the terminal. In addition, the feature information list may further be obtained by requesting to or negotiating with the server, after the terminal application initiates the network slice connection request and before the terminal application performs the connection to the network slice. Regarding how the feature information list including authorized application feature information is obtained, the present embodiment does not make specific limitations in this regard.

In addition, in an embodiment, with reference to FIG. 4, the method for managing network slice connection may further include, but is not limited to, the following:

In S400, application information updating request information of an authorized target terminal application is transmitted to the server.

In S500, the feature information list transmitted by the server according to the application information updating request information is obtained and stored.

In an embodiment, the target terminal application may be all terminal applications in the terminal which are authorized by the server, or may be one or certain terminal applications in the terminal which are authorized by the server. The present embodiment does not make specific limitations in this regard. For example, in the authentication process, if the terminal cannot determine whether the locally stored application feature information of a certain terminal application is correct, the terminal may query and request the server to update the application feature information of the terminal application.

In an embodiment, the feature information list including authorized application feature information, and stored in the terminal may be obtained by requesting the server, after the terminal completes registration with the network.

When the target terminal application is all terminal applications authorized by the server in the terminal, after the terminal successfully registers with the 5G network, the terminal may interact with a corresponding server and transmit application information updating request information of all authorized terminal applications to the server. According to the application information updating request information, the server may determine a corresponding authorized terminal application and authorized application feature information corresponding to the authorized terminal application, form a feature information list according to the authorized terminal application and the corresponding authorized application feature information, and transmit the feature information list to the terminal. After receiving the feature information list, the terminal may store the feature information list, so that the feature information list can be used, in the subsequent steps, to perform authentication process on a terminal application initiating a network slice connection request.

In an embodiment, authorized application feature information in the feature information list is used to differentiate and identify a certain terminal application which is authorized to use the corresponding network slice. The authorized application feature information includes, but is not limited to, an application identifier (APP ID) which is used to mark attributes of the terminal application, an application package name (the application package name may correspond to the user account of the terminal), network slice request access parameters (parameter information such as DNN, FQDN, Application ID, and IP triples) which an application is allowed to use, and application feature values. The server may control and change the type of authorized application feature information in the feature information list, and notify the terminal to update at any time. The terminal may request the server to update when needed. The present embodiment does not make any specific limitation in this regard. It is noteworthy that the application feature value is an identification parameter negotiated by the server and the terminal application in advance. The server and the terminal both may regularly update the application feature value, or may store the application feature value after the authentication identification performed on the terminal application in advance is completed. Only when the application feature information carried in the connection request information transmitted by the terminal application matches the application feature value stored in the terminal, it is considered that the corresponding terminal application has been authorized and identified.

Figure 5:
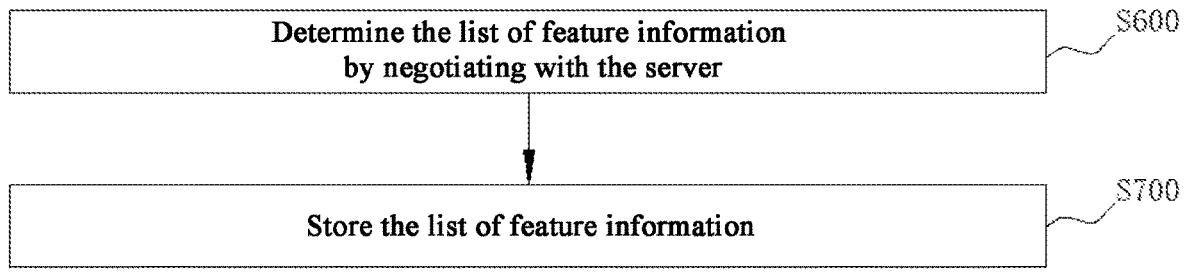
FIG. 5 is a flowchart of a method for managing network slice connection provided by another embodiment of the present application.

In addition, in an embodiment, with reference to FIG. 5, the method for managing network slice connection may further include, but is not limited to, the following:

In S600, the feature information list is determined by negotiating with the server.

S700, the feature information list is stored.

In an embodiment, the feature information list including authorized application feature information and stored in the terminal may also be obtained by negotiating with the server, after the terminal completes registration with the network. After the terminal successfully registers with the 5G network, the terminal may negotiate with the server in advance to determine a feature information list including authorized application feature information, and the feature information list is preset in the terminal. When the terminal cannot obtain the feature information list from the server, the terminal may use the preset feature information list to perform authentication process on the terminal application initiating the network slice connection request. In this way, the following situation may be avoided: the terminal cannot be authenticated because the feature information list cannot be obtained from the server. Therefore, the user demand for network slice can be guaranteed, and the user experience can be improved.

Figure 6:
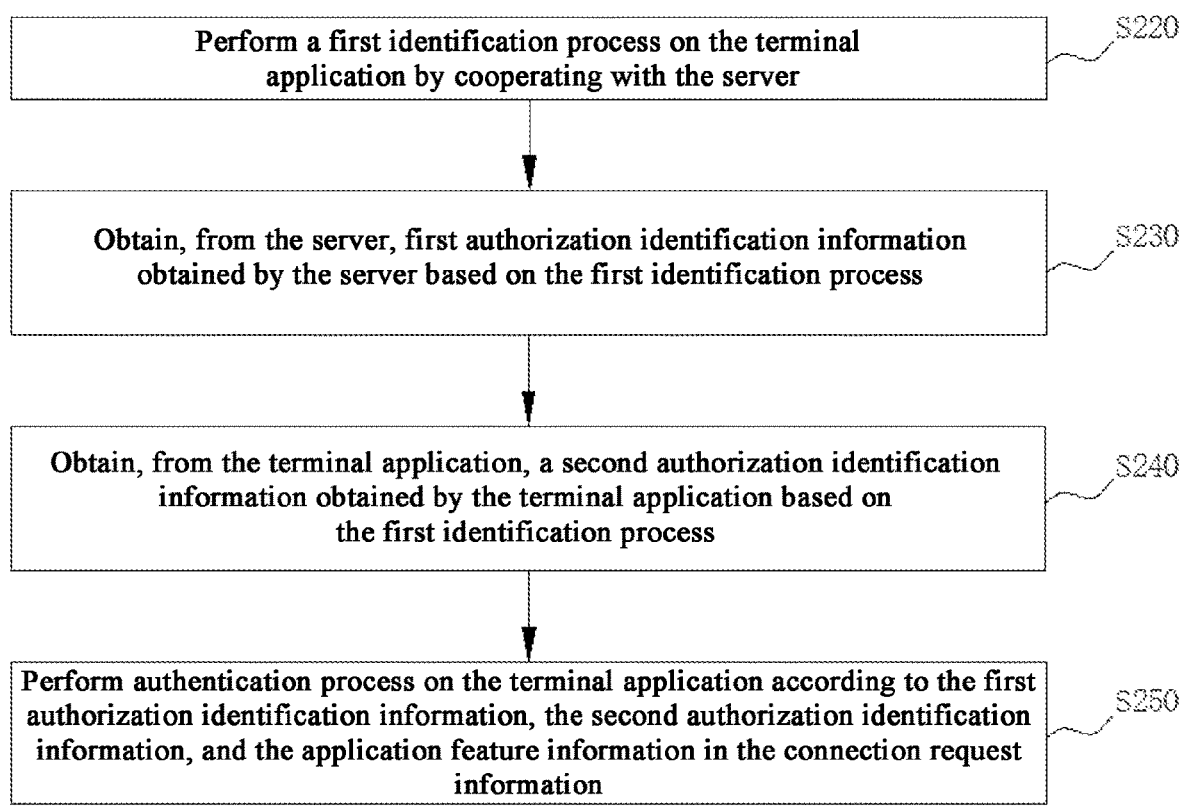
FIG. 6 is a flowchart of a method for managing network slice connection provided by another embodiment of the present application.

In addition, in an embodiment, with reference to FIG. 6, S200 may further include, but is not limited to, the following:

In S220, a first identification process is performed on the terminal application by cooperating with the server.

In S230, first authorization identification information obtained by the server based on the first identification process is obtained from the server.

In S240, second authorization identification information obtained by the terminal application based on the first authentication process is obtained from the terminal application.

In S250, an authentication process is performed on the terminal application according to the first authorization identification information, the second authorization identification information, and the application feature information in the connection request information.

It is noteworthy that S220 to S250 in the present embodiment and S210 in the embodiment as shown in FIG. 3 belong to parallel solutions.

In an embodiment, when a terminal application initiates a network slice connection request, the terminal may first suspend the network slice connection request and cooperate with the server to perform a first identification process on the terminal application. At this point, the terminal application will first interact with the corresponding server and complete the first identification process of the terminal application with the server. After the first identification process is completed, the server will obtain first authorization identification information according to the result of the first identification process, and the terminal application will also obtain second authorization identification information according to the result of the first identification process. At this point, the terminal will obtain the first authorization identification information and the second authorization identification information from the corresponding server and terminal application, and perform authentication process on the terminal application according to the first authorization identification information, the second authorization identification information, and the application feature information in the connection request information. Since the authentication process on the terminal application is performed using the first authorization identification information, the second authorization identification information, and the application feature information in the connection request information, even if another non-compliant terminal application obtains in advance the parameter information of a compliant terminal application when the compliant terminal application requests connection to the network slice, the non-compliant terminal application will be determined to fail the authentication process because the non-compliant terminal application lacks the second authorization identification information obtained according to the result of the first identification process. Therefore, the network slice connection request initiated by the non-compliant terminal application will not be accepted, and the non-compliant terminal application can be prevented from fraudulently using or attacking the network slice.

In an embodiment, the first identification process performed on the terminal application by cooperating with the server may include authentication identification manners such as a digital signature or token-based identity verification. In addition, the authentication identification mechanism of the first authentication process may further include: transmitting, to the server, encrypted application feature information which is obtained by the user after the user buys the network slice service, and the server confirming the application feature information to judge whether the corresponding terminal application passes the authentication process. Regarding the specific manner of the first identification process, the present embodiment is not intended to make a limitation.

In an embodiment, the first identification process performed on the terminal application by cooperating with the server may further be executed after the terminal registers with the network and before the terminal application initiates the network slice connection request. After the terminal registers with the network, the terminal may first trigger and complete, with the server, the first identification process on the terminal application through the default PDU session, and after the terminal completes the first identification process, the terminal stores in advance the first authorization identification information and the second authorization identification information corresponding to the corresponding terminal application. In this way, when the corresponding terminal application initiates the network slice connection request, the corresponding first authorization identification information and second authorization identification information may be directly obtained from the terminal for performing the authentication process. Therefore, the time of cooperating with the server to perform the first identification process on the terminal application can be stored, the efficiency of the terminal application connecting to the network slice is increased, and the user experience can be improved.

In addition, in an embodiment, S250 may include, but is not limited to, the following:

In response to the first authorization identification information, the second authorization identification information, and the application feature information being matched, it is determined that the terminal application passes the authentication process.

In an embodiment, after the first authorization authentication information and the second authorization authentication information are obtained when the terminal cooperates with the server to perform the first identification process on the terminal application, the authentication process is performed on the terminal application according to the first authorization identification information, the second authorization identification information, and the application feature information in the connection request information. In response to the first authorization identification information, the second authorization identification information, and the application feature information being matched, it may be determined that the terminal application passes the authentication process. Therefore, in the subsequent steps, when the process of connecting to the network slice is performed on the terminal application that has passed the authentication process, other non-compliant terminal applications can be prevented from fraudulently using or attacking the network slice. It is noteworthy that if any one of the first authorization identification information, the second authorization identification information, and the application feature information does not match the other information, it may be considered that the terminal application fails to pass the authentication process. Therefore, non-compliant terminal applications can be prevented from fraudulently using or attacking the network slice.

In addition, in an embodiment, S200 may further include, but is not limited to, the following:

In response to the terminal application carrying signature identification information, it is determined that the terminal application passes the authentication process.

It is noteworthy that the step in this embodiment, S210 in the embodiment is shown in FIG. 3 and S220 to S250 in the embodiment as shown in FIG. 6 belong to parallel solutions.

In an embodiment, all terminal applications in the terminal may be subjected to a special application signature by the terminal in advance. The mechanism for application signature may adopt an existing mechanism in certain situations, such as the standard signature mechanism for the Android system platform, etc. so that the terminal application carries the signature identification information. Therefore, when a terminal application initiates a network slice connection request, if it is detected that the terminal application carries the signature identification information, it may be determined that the terminal application has passed the authentication process. In the subsequent steps, when the process of connecting to the network slice is performed on the terminal application that has passed the authentication process, other non-compliant terminal applications can be prevented from fraudulently using or attacking the network slice.

It is noteworthy that in the present embodiment, only the network slice connection request initiated by the terminal application that carries the signature identification information will be accepted by the terminal, and the process of connecting to the network slice will be performed. Regarding a network slice connection request initiated by a terminal application that does not carry the signature identification information, the terminal will directly return request failure information.

In addition, in an embodiment, the method for managing network slice connection may further include, but is not limited to, the following:

In response to the terminal application failing to pass the authentication process, the network slice connection request currently initiated by the terminal application is terminated, or the terminal application is enabled to re-initiate a network slice connection request, or the terminal application is enabled to connect to a terminal-default network.

In an embodiment, in some cases, when the terminal application does not pass the authentication process, it means that the terminal application might be a non-compliant terminal application. In order to prevent a non-compliant terminal application from fraudulently using or attacking the network slice, the terminal may terminate the network slice connection request currently initiated by the terminal application, so as to guarantee the usage security of the network slice. In addition, in some cases, the situation that the terminal application does not pass the authentication process might be enabled by network instability or terminal operation instability. In these cases, it does not mean that the terminal application is a non-compliant terminal application. Therefore, the terminal may notify the terminal application to re-initiate the network slice connection request, so that authentication process may be re-performed on the terminal application. If the terminal application passes the re-authentication process, connection to the network slice may be performed on the terminal application. If the re-authentication fails, it may be considered that the terminal application is a non-compliant terminal application. In addition, in some cases, the reason why the terminal application does not pass the authentication process might be that the permission of the terminal application has expired. In those cases, it does not mean that the terminal application is a non-compliant terminal application. Therefore, the terminal may connect the terminal application to a terminal-default network, so as to guarantee the normal use of the terminal application.

In addition, in an embodiment, the method for managing network slice connection may further include, but is not limited to, the following:

In response to the number of network slice connection requests re-initiated by a terminal application that fails to pass the authentication process exceeding a preset number within a preset time period, the terminal application is prohibited from re-initiating a network slice connection request.

In an embodiment, if a case where the network instability or terminal operation instability causes the authentication failure of a terminal application exists, the terminal may allow the terminal application to re-initiate a network slice connection request. However, in order to prevent malicious attacks by non-compliant terminal applications from interfering with network slice connection requests of compliant terminal applications, the terminal may limit the number of network slice connection requests initiated by the same terminal application within the same time period. When the number of network slice connection requests re-initiated by a terminal application that fails to pass the authentication process exceeds a preset number within a preset time period, it may be considered that the terminal application is a non-compliant terminal application and is conducting malicious attacks. Therefore, the terminal may prohibit the terminal application from re-initiating a network slice connection request. In this way, malicious attacks by non-compliant terminal applications can be prevented from interfering with network slice connection requests of compliant terminal applications, so that the normal use of compliant terminal applications can be guaranteed.

In addition, an embodiment of the present application further provides a terminal, the terminal includes a memory, a processor, and a computer program that is stored on the memory and executable on the processor.

The processor and the memory may be connected by a bus or in other ways.

As a non-transient computer-readable storage medium, the memory may be used to store non-transient software programs and non-transient computer-executable programs. In addition, the memory may include a high-speed random access memory, and may further include a non-transient memory device, such as at least one magnetic disk storage device, a flash memory device, or other non-volatile solid-state storage devices. In some embodiments, the memory may include memories disposed remotely from the processor, which may be connected to the processor via a network. Examples of the above network include, but are not limited to, the Internet, intranets, local area networks, mobile communication networks, and combinations thereof.

It is noteworthy that the terminal in the present embodiment may include the system architecture in the embodiment as shown in FIG. 1. The terminal in the present embodiment and the system architecture in the embodiment as shown in FIG. 1 belong to the same application concept. Therefore, these embodiments have the same implementation principles and technical effects, which are not detailed here.

The non-transient software programs and instructions for implementing the method for managing network slice connection in the above embodiments are stored in the memory, and when executed by the processor, perform the above method for managing network slice connection, e.g., perform the above described S100 to S300 in FIG. 2, S210 in FIG. 3, S400 to S500 in FIG. 4, S600 to S700 in FIG. 5, and S220 to S250 in FIG. 6.

The apparatus embodiments described above are merely illustrative. Units described as separate components may or may not be physically separate, i.e., may be located in one place, or may be distributed over multiple network units. Some or all of the modules may be selected according to actual needs to achieve the solution in the present embodiment.

In addition, an embodiment of the present application further provides a computer-readable storage medium. The computer-readable storage medium stores computer-executable instructions which, when executed by one processor or controller, e.g., executed by the processor in the above terminal embodiment, may cause the processor to perform the method for managing network slice connection in the above embodiments, e.g., perform the above described S100 to S300 in FIG. 2, S210 in FIG. 3, S400 to S500 in FIG. 4, S600 to S700 in FIG. 5, and S220 to S250 in FIG. 6.

Embodiments of the present application include the following: connection request information transmitted by a terminal application is obtained in a case where the terminal application initiates a network slice connection requests; authentication process is performed on the terminal application initiating the network slice connection request; when the terminal application passes the authentication process, the terminal application is enabled to connect to the network slice according to the connection request information. According to the solutions provided by the embodiments of the present application, when connection request information transmitted by a terminal application due to the terminal application initiating a network slice connection request is received, firstly authentication process is performed on the terminal application that initiates the network slice connection request. Only in a case where the terminal application passes the authentication process, the terminal application is enabled to connect to the network slice according to the connection request information. Therefore, other non-compliant terminal applications can be prevented from fraudulently using or attacking network slices.

Those of ordinary skill in the art may understand that all or part of steps in the methods disclosed above and the system may be implemented as software, firmware, hardware, and appropriate combinations thereof. Some or all physical components may be implemented as software executed by a processor such as a central process unit, a digital signal processor or a microprocessor, or as hardware, or as an integrated circuit such as an application specific integrated circuit. Such software may be distributed on computer-readable media, which may include computer storage media (or non-transitory media) and communication media (or transitory media). As is known to those of ordinary skill in the art, the term "computer storage media" includes both volatile and nonvolatile, and removable and non-removable media implemented in any method or technology for storage of information (such as computer-readable instructions, data structures, program modules or other data). Computer storage media include, but are not limited to, RAM, ROM, EEPROM, flash memory or other memory technology, CD-ROM, digital versatile disk (DVD) or other optical disk storage, magnetic cartridges, magnetic tape, magnetic disk storage or other magnetic storage devices, or any other medium which is used to store desired information and can be accessed by a computer. In addition, those of ordinary skill in the art know that communication media typically include computer-readable instructions, data structures, program modules, or other data in a modulated data signal such as a carrier wave or other transport mechanism, and may include any information delivery media.

The preferred embodiments of the present application have been described above, whereas the present application is not limited to the above embodiments. Various equivalent alteration or substitutions made by those skilled in the art without departing from the spirit of the present application shall fall within the scope defined by the claims of the present application.

We claim:

1. A method for managing network slice connection, comprising:
   obtaining connection request information transmitted by a terminal application in a case where the terminal application initiates a network slice connection request, wherein, the connection request information comprises application feature information corresponding to the terminal application;
   performing an authentication process on the terminal application initiating the network slice connection request;
   in response to the application feature information in the connection request information matching a feature information list stored in a terminal, determining that the terminal application passes the authentication process, wherein the feature information list comprises authorized application feature information corresponding to terminal applications authorized by a server;
   in response to the terminal application passing the authentication process, enabling the terminal application to connect to network slice according to the connection request information;
   transmitting, to the server, application information updating request information of an authorized target terminal application; and
   obtaining and storing the feature information list transmitted by the server according to the application information updating request information.

2. The method according to claim 1, further comprising:
   in response to the terminal application failing to pass the authentication process, terminating the network slice connection request currently initiated by the terminal application, or enabling the terminal application to re-initiate the network slice connection request, or enabling the terminal application to be connected to a terminal-default network.

3. The method according to claim 2, further comprising:
   in response to a number of network slice connection requests re-initiated by the terminal application that fails to pass the authentication process exceeding a preset number for a preset time period, prohibiting the terminal application from re-initiating the network slice connection request.

4. The method according to claim 1, further comprising:
   determining the feature information list by negotiating with the server; and
   storing the feature information list.

5. A method for managing network slice connection, comprising:
   obtaining connection request information transmitted by a terminal application in a case where the terminal application initiates a network slice connection request, wherein, the connection request information comprises application feature information corresponding to the terminal application;
   performing an authentication process on the terminal application initiating the network slice connection request;
   performing a first identification process on the terminal application by cooperating with a server;
   obtaining, from the server, first authorization identification information obtained by the server based on the first identification process;
   obtaining, from the terminal application, second authorization identification information obtained by the terminal application based on the first identification process;
   performing the authentication process on the terminal application according to the first authorization identification information, the second authorization identification information, and the application feature information in the connection request information; and in response to the terminal application passing the authentication process, enabling the terminal application to connect to network slice according to the connection request information.

6. The method according to claim 5, wherein performing the authentication process on the terminal application according to the first authorization identification information, the second authorization identification information, and the application feature information in the connection request information comprises:

in response to the first authorization identification information, the second authorization identification information, and the application feature information being matched, determining that the terminal application passes the authentication process.

7. The method according to claim 5, further comprising:
in response to the terminal application carrying signature identification information, determining that the terminal application passes the authentication process.

8. The method according to claim 5, further comprising:
in response to the terminal application failing to pass the authentication process, terminating the network slice connection request currently initiated by the terminal application, or enabling the terminal application to re-initiate the network slice connection request, or enabling the terminal application to connect to a terminal-default network.

9. The method according to claim 8, further comprising:
in response to a number of network slice connection requests re-initiated by the terminal application that fails to pass the authentication process exceeding a preset number for a preset time period, prohibiting the terminal application from re-initiating the network slice connection request.

10. A terminal, comprising:
a memory;
a processor; and
a computer program stored on the memory and executable on the processor,
wherein the processor, when executing the computer program, implements the method for managing network slice connection according to claim 5.

11. A non-transitory computer-readable storage medium, which stores computer-executable instructions, the computer-executable instructions being used to perform the method according to claim 5.

12. The non-transitory computer-readable storage medium according to claim 11, wherein performing the authentication process on the terminal application according to the first authorization identification information, the second authorization identification information, and the application feature information in the connection request information comprises:

in response to the first authorization identification information, the second authorization identification information, and the application feature information being matched, determining that the terminal application passes the authentication process.

13. A terminal, comprising:
a memory;
a processor; and
a computer program stored on the memory and executable on the processor, wherein the processor, when executing the computer program, is configured to:

obtain connection request information transmitted by a terminal application in a case where the terminal application initiates a network slice connection request, wherein, the connection request information comprises application feature information corresponding to the terminal application;

perform an authentication process on the terminal application initiating the network slice connection request;

in response to the application feature information in the connection request information matching a feature information list stored in a terminal, determine that the terminal application passes the authentication process, wherein the feature information list comprises authorized application feature information corresponding to terminal applications authorized by a server;

in response to the terminal application passing the authentication process, enable the terminal application to connect to network slice according to the connection request information;

transmit, to the server, application information updating request information of an authorized target terminal application; and obtain and store the feature information list transmitted by the server according to the application information updating request information.

14. The terminal according to claim 13, wherein the processor is further configured to:
determine the feature information list by negotiating with the server; and
store the feature information list.

15. The terminal according to claim 13, wherein the processor is further configured to:
in response to the terminal application failing to pass the authentication process, terminate the network slice connection request currently initiated by the terminal application, or enable the terminal application to re-initiate the network slice connection request, or enable the terminal application to be connected to a terminal-default network.

16. The terminal according to claim 15, wherein the processor is further configured to:
in response to a number of network slice connection requests re-initiated by the terminal application that fails to pass the authentication process exceeding a preset number for a preset time period, prohibit the terminal application from re-initiating the network slice connection request.

17. A non-transitory computer-readable storage medium, which stores computer-executable instructions, the computer-executable instructions being used to:

obtain connection request information transmitted by a terminal application in a case where the terminal application initiates a network slice connection request, wherein, the connection request information comprises application feature information corresponding to the terminal application;

perform an authentication process on the terminal application initiating the network slice connection request;

in response to the application feature information in the connection request information matching a feature information list stored in a terminal, determine that the terminal application passes the authentication process, wherein the feature information list comprises authorized application feature information corresponding to terminal applications authorized by a server;

in response to the terminal application passing the authentication process, enable the terminal application to connect to network slice according to the connection request information;

transmit, to the server, application information updating request information of an authorized target terminal application; and obtain and store the feature information list transmitted by the server according to the application information updating request information.

18. The non-transitory computer-readable storage medium according to claim 17, wherein the computer-executable instructions are further used to:

determine the feature information list by negotiating with the server; and store the feature information list.

19. The non-transitory computer-readable storage medium according to claim 17, wherein the computer-executable instructions are further used to:

in response to the terminal application failing to pass the authentication process, terminate the network slice connection request currently initiated by the terminal application, or enable the terminal application to re-initiate the network slice connection request, or enable the terminal application to be connected to a terminal-default network.

20. The non-transitory computer-readable storage medium according to claim 19, wherein the computer-executable instructions are further used to:

in response to a number of network slice connection requests re-initiated by the terminal application that fails to pass the authentication process exceeding a preset number for a preset time period, prohibit the terminal application from re-initiating the network slice connection request.

* * * * *